US010091088B2

(12) United States Patent
Wilhelmsson

(10) Patent No.: US 10,091,088 B2
(45) Date of Patent: Oct. 2, 2018

(54) MODE SELECTION FOR A COMMUNICATIONS SESSION

(71) Applicant: Telefonaktiebolaget LM Ericsson (publ), Stockholm (SE)

(72) Inventor: Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 276 days.

(21) Appl. No.: 15/033,760

(22) PCT Filed: Nov. 4, 2013

(86) PCT No.: PCT/EP2013/072919
§ 371 (c)(1),
(2) Date: Jun. 2, 2016

(87) PCT Pub. No.: WO2015/062672
PCT Pub. Date: May 7, 2015

(65) Prior Publication Data
US 2016/0277278 A1    Sep. 22, 2016

(51) Int. Cl.
*H04L 12/28* (2006.01)
*H04L 12/26* (2006.01)
(Continued)

(52) U.S. Cl.
CPC ............... *H04L 43/16* (2013.01); *H04W 4/80* (2018.02); *H04W 40/16* (2013.01);
(Continued)

(58) Field of Classification Search
CPC ........ H04L 43/16; H04W 4/80; H04W 40/16; H04W 52/0216
(Continued)

(56) References Cited

U.S. PATENT DOCUMENTS 6,178,161 B1 * 1/2001 Terry ................... H04L 5/1438
370/276
7,818,446 B2 * 10/2010 Katayama ............ H04N 21/643
709/232

(Continued)

FOREIGN PATENT DOCUMENTS

GB       2489690 A       10/2012
WO    2006083136 A1      8/2006

OTHER PUBLICATIONS

PCT International Search Report, dated Jul. 2, 2014, in connection with International Application No. PCT/EP2013/072919, all pages.
(Continued)

*Primary Examiner* — Thai D Hoang
(74) *Attorney, Agent, or Firm* — Sage Patent Group

(57) ABSTRACT

There is provided mode selection for a communications session. A first device transmits, to a second device, an initial transmit packet of a communications session. The initial transmit packet indicates at least two modes of operation configurable by the first device during the communications session. The first device receives, from the second device, an initial receive packet of the communications session. The initial receive packet indicates one of the at least two modes of operation configurable by the second device during the communications session.

15 Claims, 5 Drawing Sheets

(51) Int. Cl.
*H04W 40/16* (2009.01)
*H04W 52/02* (2009.01)
*H04W 4/80* (2018.01)
*H04W 4/20* (2018.01)
*H04W 88/06* (2009.01)

(52) U.S. Cl.
CPC .......... *H04W 52/0216* (2013.01); *H04W 4/20* (2013.01); *H04W 88/06* (2013.01); *Y02D 70/00* (2018.01); *Y02D 70/1262* (2018.01); *Y02D 70/144* (2018.01)

(58) Field of Classification Search
USPC ............... 370/254–255, 346–348, 449, 507
See application file for complete search history.

(56) References Cited

U.S. PATENT DOCUMENTS

| | | | | |
|---|---|---|---|---|
| 8,780,872 | B1* | 7/2014 | Ramamurthy | H04B 7/024 370/328 |
| 9,712,951 | B2* | 7/2017 | Kirshenberg | H04W 4/008 |
| 2004/0093423 | A1* | 5/2004 | Kaniyur | H04L 12/44 709/232 |
| 2006/0209712 | A1* | 9/2006 | Morioka | H04L 1/0025 370/252 |
| 2007/0002732 | A1* | 1/2007 | Batni | G06F 9/445 370/229 |
| 2007/0133490 | A1 | 6/2007 | Kwon | |
| 2007/0171858 | A1 | 7/2007 | Grandhi et al. | |
| 2007/0286196 | A1* | 12/2007 | Fan | H04W 72/085 370/392 |
| 2008/0238629 | A1* | 10/2008 | Gonikberg | H04L 1/0002 340/10.4 |
| 2011/0075682 | A1* | 3/2011 | Altmann | G09G 5/006 370/465 |
| 2013/0003710 | A1* | 1/2013 | Adams | H04W 88/06 370/338 |
| 2013/0051266 | A1* | 2/2013 | Kim | H04L 1/0072 370/252 |
| 2014/0323048 | A1* | 10/2014 | Kang | H04W 4/008 455/41.2 |

OTHER PUBLICATIONS

PCT Written Opinion, dated Jul. 2, 2014, in connection with International Application No. PCT/EP2013/072919, all pages.

* cited by examiner

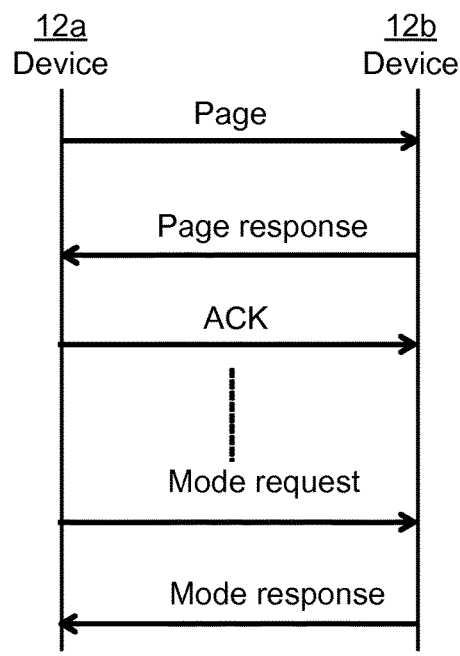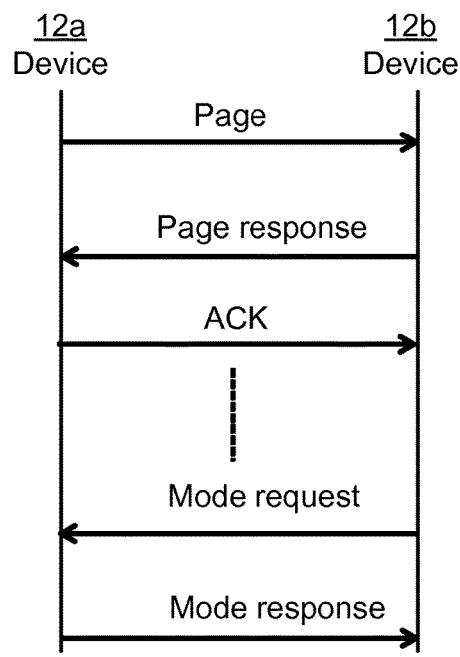
Fig. 4                    Fig. 5
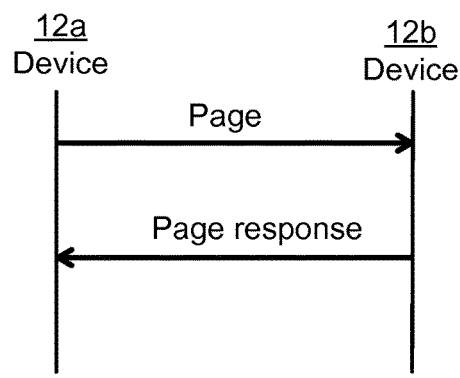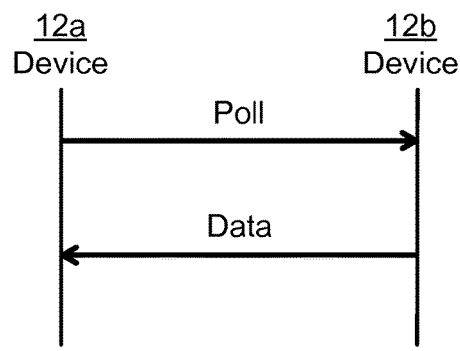
Fig. 6                    Fig. 7

MODE SELECTION FOR A COMMUNICATIONS SESSION

TECHNICAL FIELD

Embodiments presented herein relate to mode selection, and particularly to methods, devices, computer programs, and a computer program product for mode selection for a communications session.

BACKGROUND

In communication systems, there is always a challenge to obtain good performance and capacity for a given communications protocol, i.e., using parameters which are most suitable for f the physical environment in which the communication system is deployed.

It is envisioned that there will soon be a large amount of connected devices, i.e., devices that are able to communicate with other devices. It is further envisioned that a large fraction of the connections will be between a sensor device and a gateway device. In general terms, sensor data, such as temperature, humidity, velocity, etc., typically contains very little data and needs to be transmitted from the sensor device to the gateway device relatively seldom at irregular intervals. The gateway device could for example be a mobile phone, a laptop computer, or a fixed mounted access point (AP). The backhaul for the gateway device may either be a cellular network based on radio access technologies of the 3rd Generation Partnership Project (3GPP) such as LTE (Long Term Evolution) or WCDMA (Wideband Code Division Multiple Access) or it could be a wired network.

As the amount of data to be transmitted increases, the time for the actual data starts to be of more important and the time for setting up the connection will be more important.

In case small amounts of data are transmitted from the sensor device at irregular intervals, this data should be transmitted in a power efficient way to the gateway device. One reason for this is that although the time needed for the actual data transfer is very small, the time it takes to resynchronize the two devices (i.e., the sensor device and the gateway device) often take a relatively long time and therefore accounts for the larger part of the power consumption. In Bluetooth, for instance, when a device wants to connect to another device to which is previously been connected it enters the page state and start transmitting a page train. This paging process may have a duration for more than a second before the connection is established. If the actual data to be transmitted is only one packet, this transmission, including an acknowledgement of the packet, takes 1.25 ms.

When Bluetooth was introduced, the highest data rate was 1 Mbps gross rate using binary modulation in a bandwidth of 1 MHz. In Bluetooth Low Energy (BLE) the signal transmitted over the air (i.e. over the radio interface) is very similar to what is the case for Bluetooth legacy. BLE is part of the Bluetooth 4.0 specification, and more details about BLE can for instance be found in the book by Robin Heydon: "Bluetooth Low Energy, The developer's handbook". For BLE the connection time is reduced (in comparison to Bluetooth legacy) by dedicating three frequencies for discovery only, which means that there is less uncertainty for the paging device concerning where the other device is listening. In addition, since the frequencies are only used for discovering and not for the actual communication the probability that some other devices are using the same frequencies is minimized.

According to BLE terminology, a device which is available to set up a connection announces this by entering an advertising state where this availability is advertised. Another device may scan for, and receive, this advertising message. Upon reception of this advertising the device receiving the advertising message may in turn reply with a connection request in order to set up a connection to the device transmitting the advertising message. The time it takes for setting up a connection and transmitting one data packet may in this case be as little as 3 ms.

In addition, when several sensor devices already have established a connection to a gateway device, there is no time for connection set-up, but the time for the data transfer is determined by the transmission speed of the data. It may be beneficial to increase the data rate of BLE by adding a mode which supports at least twice the data rate. However, in order to be backwards compatible, the above disclosed advertising process should still be performed using the low rate mode.

Furthermore, currently several communications standards are able to operate in several modes, where the mode of operation may depend on the current channel conditions or it may depend on the ability of other devices. Bluetooth Enhanced Data Rate (EDR) supports up to 3 Mbps in a backwards compatible way. According to Bluetooth EDR two devices start out in the legacy 1 Mbps mode and then negotiate for the EDR mode. The possibility to use the EDR mode requires that both devices are EDR capable. If only one of the devices is EDR capable, the communication will have to use the legacy 1 Mbps mode.

Although this means that the more effective EDR mode can be used whenever both devices are EDR capable, it takes some time before the EDR mode may be entered since the mode has to be negotiated between the devices. For applications such as stereo audio streaming (which is a possible application for EDR), it does not matter if there is an initial negotiation phase which lasts 10-20 ms, when the actual application may run for several minutes. However, when the actual data transfer only requires a small amount of packets to be transmitted, as for example only one packet, starting out in one mode and later switching to a another mode may not be feasible.

Hence, there is still a need for an improved selection of which mode of operation to use for a communications session.

SUMMARY

An object of embodiments herein is to provide improved selection of which mode of operation to use for a communications session.

The inventor of the enclosed embodiments have realized that one issue with existing mechanisms for mode selection is that a sub-optimum mode is used during the negotiation mode and therefore existing mechanisms for very short sessions are not at all useful. The inventor of the enclosed embodiments have therefore further realized that there is a need to be able choose the best mode of operation without the need for negotiation such that the best mode can be used also in case there is only one or a few packets of data to be transmitted.

A particular object is therefore to provide improved selection of which mode of operation to use for a communications session involving transmission of few data packets.

According to a first aspect there is presented method for mode selection for a communications session. The method is performed by a first device. The method comprises transmitting, to a second device, an initial transmit packet of a communications session. The initial transmit packet indicates at least two modes of operation configurable by the first device during the communications session. The method comprises receiving, from the second device, an initial receive packet of the communications session. The initial receive packet indicates one of the at least two modes of operation configurable by the second device during the communications session.

According to a second aspect there is presented a method for mode selection for a communications session. The method is performed by a second device. The method comprises receiving, from a first device, an initial transmit packet of a communications session. The initial transmit packet indicates at least two modes of operation configurable by the first device during the communications session. The method comprises selecting one of the at least two modes of operation configurable by the second device during the communications session. The method comprises transmitting, to the first device, an initial receive packet of the communications session. The initial receive packet indicates the one of the at least two modes of operation.

Advantageously this provided improved selection of which mode of operation to use for a communications session.

Advantageously this enables improved selection of which mode of operation to use for a communications session involving transmission of few data packets.

Advantageously this provides a means to use the most suitable mode of operation also for very short messages, e.g. containing only one packet in each direction.

Advantageously this allows for improved spectrum efficiency, improved robustness to interference as the duration if the sent packet becomes shorter in case a higher data rate mode can be used, and also decreased energy consumption as the energy consumption is largely dependent on the packet duration.

According to a third aspect there is presented a device for mode selection for a communications session. The device comprises a processing unit. The processing unit is arranged to transmit, to a second device, an initial transmit packet of a communications session. The initial transmit packet indicates at least two modes of operation configurable by the device during the communications session. The processing unit is arranged to receive, from the second device, an initial receive packet of the communications session. The initial receive packet indicates one of the at least two modes of operation configurable by the second device during the communications session.

According to a fourth aspect there is presented a device for mode selection for a communications session. The device comprises a processing unit. The processing unit is arranged to receive, from a first device, an initial transmit packet of a communications session. The initial transmit packet indicates at least two modes of operation configurable by the first device during the communications session. The processing unit is arranged to select one of the at least two modes of operation configurable by the device during the communications session. The processing unit is arranged to transmit, to the first device, an initial receive packet of the communications session. The initial receive packet indicates the one of the at least two modes of operation.

According to a fifth aspect there is presented a computer program for mode selection for a communications session, the computer program comprising computer program code which, when run on a device, causes the device to perform a method according to the first aspect.

According to a sixth aspect there is presented a computer program for mode selection for a communications session, the computer program comprising computer program code which, when run on a device, causes the device to perform a method according to the second aspect.

According to a seventh aspect there is presented a computer program product comprising a computer program according to at least one of the fifth aspect and the sixth aspect and a computer readable means on which the computer program is stored. The computer readable means may be non-volatile readable means.

It is to be noted that any feature of the first, second, third, fourth, fifth, sixth, and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 4 and 5 are sequence diagrams according to prior art;

FIGS. 6, 7, and 8 are sequence diagrams according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
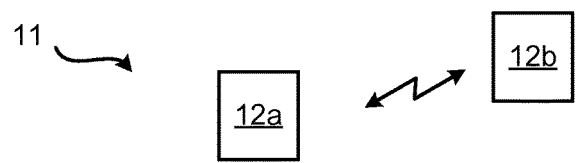
FIG. 1 is a schematic diagram illustrating a communications system according to an embodiment.

FIG. 1 is a schematic diagram illustrating a communications system 11 where embodiments presented herein can be applied. The communications system 11 comprises a first device 12a and a second device 12b. The first device 12a and the second device 12b are configured for communications between each other. Hence, the first device 12a is configured for transmission of data to the second device 12b and for reception of data from the second device 12b. The second device 12b is configured for transmission of data to the first device 12a and for reception of data from the first device 12a.

One of the first device 12a and the second device 12b may be a data sensor device and the other of the first device 12a and the second device 12b may be a data collector device. Sensor data, such as temperature, humidity, velocity, etc., is sensed by the data sensor device and is to be transmitted from the data sensor device to the data collector device. The data collector device could for example be a mobile phone, a laptop computer, or a fixed mounted access point (AP). The data collector device acts as a gateway device for the data sensor device. The backhaul (not illustrated in FIG. 1) for the data collector device may either be a cellular network based on radio access technologies of the 3rd Generation Partnership Project (3GPP) such as LTE (Long Term Evolution) or WCDMA (Wideband Code Division Multiple Access) or it could be a wired network.

In order to ease the description, but without limiting the scope, the inventive concepts are described as being used in connection with an evolved mode for Bluetooth Low Energy (BLE). Suppose that the two devices 12a, 12b are to exchange some information using BLE. According to BLE, a connection event starts with a first device 12a advertising it is available for communication, by sending an advertising packet. A second device 12b is at the same time scanning for advertising packets. When the second device 12b receives the advertising packet, it responds with transmitting a connection request packet to the first device 12a. After the connection request has been sent, the second device 12b moves into connection mode and if the connection request packet is correctly received by the first device 12a, so does the first device 12a. To ensure that the first device 12a has received the connection request, the second device 12a sends an empty packet. Upon reception of this empty packet the first device 12a sends the data it wants to send. This may be single packet, but it might also be that the communications session lasts for several minutes. As the second device 12b in this example has no data to send it just sends empty packets to acknowledge that the communication link is still operable. When the first device 12a has no more data to send, a packet is sent which explicitly terminates the communications session. Also this packet is acknowledged by an empty packet from the second device 12b.

Mechanisms for selecting mode of operation will now be disclosed with references to the sequence diagrams of FIGS. 4 and 5. Suppose that BLE would support two modes; the one specified in the Bluetooth 4.0 specification and a further mode supporting twice the data rate, say. For simplicity, this mode is here referred to as BLE 2.0. Because BLE 2.0 supports twice the data rate, the data transfer will take less time and likely it will therefore also consume less energy. In addition, it will cause interference to other possible communication links for a shorter time and may also be less susceptible to interference due to the shorter transmission time. However, increasing the data rate by a factor of two may require that the channel conditions are sufficiently good. Thus, although two devices support the higher data rate, it might be that due to the channel conditions they will have to resort to using the low rate mode.

In order to ensure that a connection can be established also with devices not supporting the higher rate mode, the connection establishment is performed using the low rate mode. In case both devices 12a, 12b support the higher rate mode and the channel conditions are favorable the devices 12a, 12b are configured to select the high rate mode and in this way increase performance. The request for changing to the higher rate mode may be done by the device initiating the communication link, as illustrated in FIG. 4 or by the device responding to the request of setting up a communication link, as illustrated in FIG. 5.

In FIGS. 4 and 5, the connection between the first device 12a and the second device 12b is established by the first device 12a sending a page message and the second device 12b sending a page response as a results of receiving this page message. The connection is in this case considered established once the first device 12a has acknowledged the reception of the page response from the second device 12b.

Once the connection is established, any of the devices 12a, 12b may at any time request a change of transmission mode. In FIG. 4 a mode request is sent by the first device 12a and a mode response is sent by the second device 12b. In FIG. 5 a mode request is sent by the second device 12b and a mode response is sent by the first device 12a. The change of transmission mode may be performed as early as possible, which may be the case if the channel conditions are favorable already at the connection establishment, or it may be performed after some time triggered by that the channel conditions have improved.

This procedure typically works well, but in case very little data is to be transmitted from one device to another, the negotiation time needed to select mode of operation should be kept as short as possible.

The embodiments disclosed herein aims at avoiding, or at least reducing, any negotiation needed to determine the mode of operation to be used for a communications session between the first device 12a and the second device 12b and to ensure that the best mode of operation is chosen already from the beginning. This is accomplished by that the device performing the paging indicates e.g., what modes are supported and that the device responding to the page message selects and indicates e.g., the most suitable mode based on the information received in the paging message and its own capability.

The embodiments disclosed herein thus relate to mode selection for a communications session. In order to obtain mode selection for a communications session there is provided a first device 12a, a method performed by the first device 12a, a computer program comprising code, for example in the form of a computer program product, that when run on a first device 12a, causes the first device 12a to perform the method. In order to obtain mode selection for a communications session there is further provided a second device 12b, a method performed by the second device 12b, a computer program comprising code, for example in the form of a computer program product, that when run on a second device 12b, causes the second device 12b to perform the method.

Figure 2A:
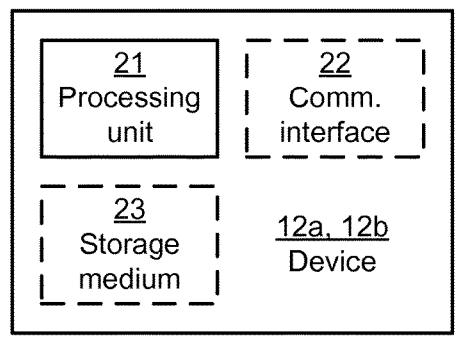
FIG. 2*a* is a schematic diagram showing functional modules of a device according to an embodiment.

FIG. 2a schematically illustrates, in terms of a number of functional modules, the components of a device 12a, 12b according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31a, 31b (as in FIG. 3), e.g. in the form of a storage medium 23. Thus the processing unit 21 is thereby arranged to execute methods as herein disclosed. The a storage medium 23 may also comprise persistent storage, which, for example, can be any single one or combination of magnetic memory, optical memory, solid state memory or even remotely mounted memory. The device 12a, 12b may further comprise a communications interface 22 for communications with another device 12a, 12b. As such the communications interface 22 may comprise one or more transmitters and receivers, comprising analogue and digital components and a suitable number of antennae for radio communications. The processing unit 21 controls the general operation of the device 12a, 12b e.g. by sending data and control signals to the communications interface 22 and the storage medium 23, by receiving data and reports from the communications interface 22, and by retrieving data and instructions from the storage medium 23. Other components, as well as the related functionality, of the device 12a, 12b are omitted in order not to obscure the concepts presented herein.

Figure 2B:
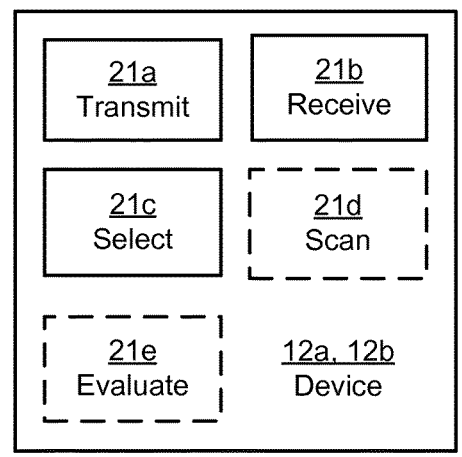
FIG. 2*b* is a schematic diagram showing functional units of a device according to an embodiment.

FIG. 2b schematically illustrates, in terms of a number of functional units, the components of a device 12a, 12b according to an embodiment. The device 12a, 12b of FIG. 2b comprises a number of functional units; a transmit unit 21a, a receive unit 21b, and a select unit 12C. The device 12a, 12b of FIG. 2b may further comprises a number of optional functional units, such as any of a scan unit 12d, and an evaluate unit 21e. The functionality of each functional unit 21a-e will be further disclosed below in the context of which the functional units may be used. In general terms, each functional unit 21a-e may be implemented in hardware or in software. The processing unit 21 may thus be arranged to from the storage medium 23 fetch instructions as provided by a functional unit 21a-e and to execute these instructions, thereby performing any steps as will be disclosed hereinafter.

Figure 3:
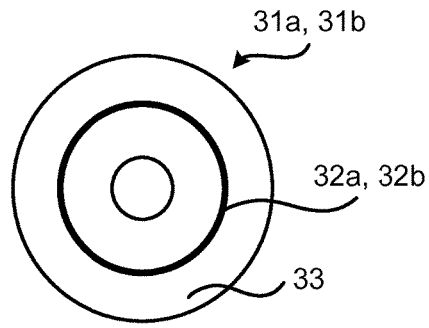
FIG. 3 shows one example of a computer program product comprising computer readable means according to an embodiment.
Figure 11:
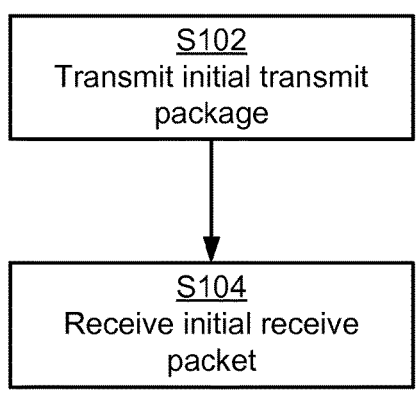
FIGS. 11, 12, 13, and 14 are flowcharts of methods according to embodiments.
Figure 12:
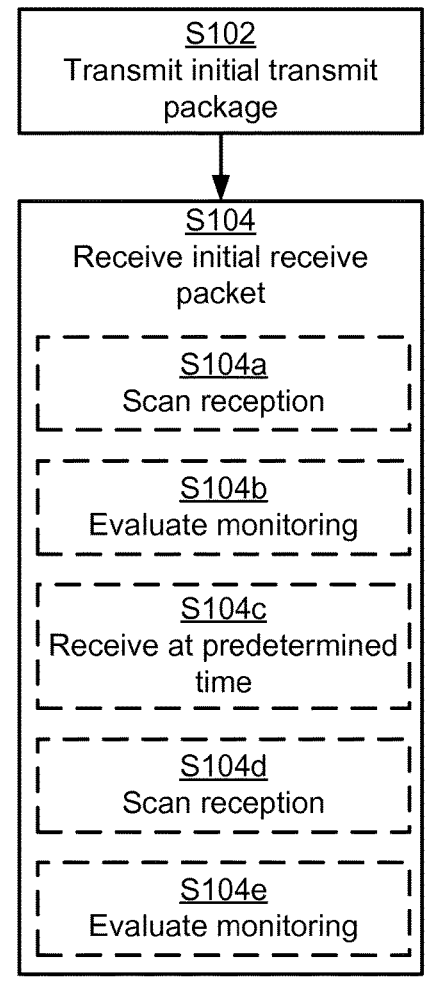
Figure 13:
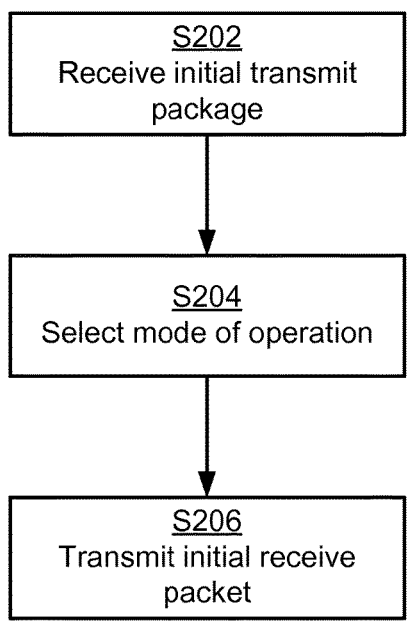
Figure 14:
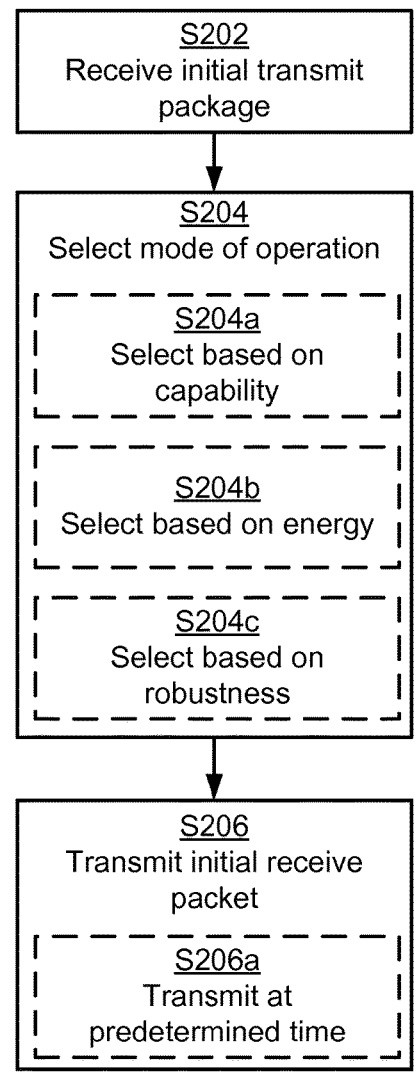

FIGS. 11 and 12 are flow chart illustrating embodiments of methods for mode selection for a communications session as performed by a first device 12a. FIGS. 13 and 14 are flow chart illustrating embodiments of methods for mode selection for a communications session as performed by a second device 12b. The methods are advantageously provided as computer programs 32a, 32b. FIG. 3 shows one example of a computer program product 31a, 31b comprising computer readable means 33. On this computer readable means 3, a computer program 32a, 32b can be stored, which computer program 32a, 32b can cause the processing unit 21 and thereto operatively coupled entities and devices, such as the communications interface 22 and the storage medium 23 to execute methods according to embodiments described herein. The computer program 32a, 32b and/or computer program product 31a, 31b may thus provide means for performing any steps as herein disclosed.

In the example of FIG. 3, the computer program product 31a, 31b is illustrated as an optical disc, such as a CD (compact disc) or a DVD (digital versatile disc) or a Blu-Ray disc. The computer program product 31a, 31b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 32a, 32b is here schematically shown as a track on the depicted optical disk, the computer program 32a, 32b can be stored in any way which is suitable for the computer program product 31a, 31b.

Reference is now made to FIG. 11 illustrating a method for mode selection for a communications session as performed by a first device 12a. The first device 12a is configured to already in its first message transmitted to the second device 12a include information about which modes of operation are supported by the first device 12a. The processing unit 21 of the first device 12a is thus arranged to, in a step S102, transmit, to the second device 12b, an initial transmit packet of a communications session. This transmit step may be performed by executing functionality of the transmit unit 21a. The computer program 32a, 32b and/or computer program product 31a, 31b may thus provide means for this transmit step. The initial transmit packet indicates at least two modes of operation configurable by the first device 12a during the communications session.

The initial transmit packet is received and processed by the second device 12b. Embodiments related thereto will be further disclosed below with references to FIGS. 13 and 14. The second device 12b transmits a response to the first message. This response is received by the first device 12a. Particularly, the processing unit 21 of the first device 12a is arranged to, in a step S104, receive, from the second device 12b, an initial receive packet of the communications session. This receive step may be performed by executing functionality of the receive unit 21b. The computer program 32a, 32b and/or computer program product 31a, 31b may thus provide means for this receive step. The initial receive packet indicates one of the at least two modes of operation configurable by the second device 12b during the communications session. Thereby the first device 12a and the second device 12b have negotiated regarding which mode of operation to use during (at least a part of) the communications session by means of only two messages; an initial transmit message and an initial receive message. These messages may be the first messages sent during the communications session.

There may be different ways to differentiate between the at least two modes of operation. Different embodiments relating thereto will now be described in turn. According to an embodiment the at least two modes of operation are based on a capability and channel conditions of the first device. The mode of operation indicated by the first device 12a may thus be the most suitable mode of operation for the first device 12a based on capability and channel conditions. Hence the first device 12a may first estimate its current channel conditions and then to the second device 12b indicate which modes of operation that are suitable for use for the current channel conditions. According to a further embodiment each one of the at least two modes of operation is associated with a unique energy consumption level. According to yet a further embodiment each one of the at least two modes of operation is associated with a unique robustness to channel interference level. According to yet a further embodiment the at least two modes of operation are based on a combination of the above.

Reference is now made to FIG. 12 illustrating further methods for mode selection for a communications session as performed by a first device 12a.

There may be different ways for the first device 12a to determine which mode of operation was selected by the second device 12b. Different embodiments relating thereto will now be described in turn.

According to an embodiment, the header of the initial receive packet is always transmitted using a predetermined mode, and based on the information provided in this header it is determined what mode is used for the remaining part of the initial receive packet.

As another example, the first device 12a may perform the reception in a blind fashion where the first device 12a is configured to demodulate the initial receive packet from the second device 12 b using the different possible modes operation which may have been used by the second device 12b to send the initial receive packet.

The reception may be performed in parallel such that all possibilities are tested at the same time, the first device 12a selecting the mode based on a successful reception. Particularly, according to an embodiment the processing unit 21 of the first device 12a is arranged to, in an optional step S104a scan reception of the initial receive packet using the at least two modes of operation in parallel; and in an optional step S104b, evaluate the monitoring for detection of the initial receive packet. This scan step may be performed by executing functionality of the scan unit 21d. The computer program 32a, 32b and/or computer program product 31a, 31b may thus provide means for this scan step. This evaluate step may be performed by executing functionality of the evaluate unit 21e. The computer program 32a, 32b and/or computer program product 31a, 31b may thus provide means for this evaluate step.

The reception may be performed in series, using the buffered data. When performed in series, the different modes of operation are tried by the first device 12a one after the other until the reception is successful. Particularly, according to an embodiment the processing unit 21 of the first device 12a is arranged to, in an optional step S104c, receive the initial receive packet at a predetermined time instant from transmitting the initial transmit packet. This receive step may be performed by executing functionality of the receive unit 21b. The computer program 32a, 32b and/or computer program product 31a, 31b may thus provide means for this receive step. The predetermined time instant indicates the one of the at least two modes.

Figure 8:
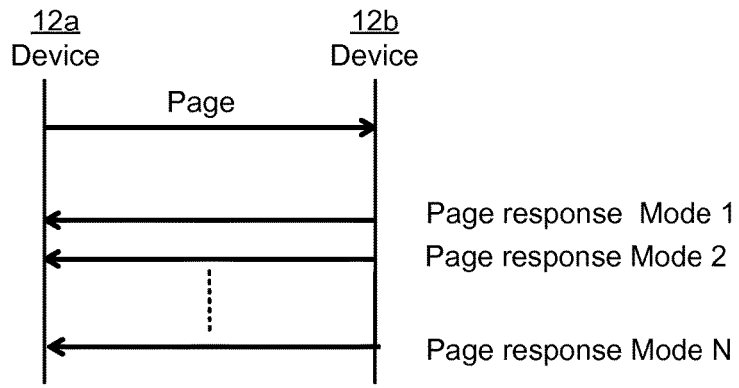

The mode of operation may further be indicated by the time the initial receive message is transmitted from the second device 12b. This is illustrated in FIG. 8. As an example, suppose that two different modes of operation are supported. If the second device 12b selects to use Mode 1, an initial receive packet is sent at a first predetermined time after the initial transmit packet was received, say 150 μs. If instead the second device 12b selects Mode 2, the corresponding initial receive packet is sent at a second predetermined time, say after 200 μs. The first device 12a may in this way start scanning for initial receive packet in Mode 1 and then scan for a Page response in Mode 2. Suppose that the transmission time for a syncword in Mode 1 is 32 μs, if the first device 12a has not detected an initial receive packet after roughly 150+32 μs, it decides that no initial receive packet has been sent using Mode 1. The first device 12a then starts to scan for an initial receive packet from the second device 12b as would be sent using Mode 2. This process may be extended to more than two modes, and the relative time between possible responses (i.e., between possible initial receive packets) might also vary. Particularly, according to an embodiment each one of the at least two modes of operation is associated with a particular predetermined time instant.

According to an embodiment the processing unit 21 of the first device 12a is arranged to sequentially for each one of the at least two modes of operation in turn and until the initial receive packet has been received, perform an optional step S104d of scanning reception of the initial receive packet during the predetermined time instant for one of the at least two modes of operation; and perform an optional step S104e of evaluating the monitoring for detection of the initial receive packet. This scan step may be performed by executing functionality of the scan unit 21d. The computer program 32a, 32b and/or computer program product 31a, 31b may thus provide means for this scan step. This evaluate step may be performed by executing functionality of the evaluate unit 21e. The computer program 32a, 32b and/or computer program product 31a, 31b may thus provide means for this evaluate step.

Reference is now made to FIG. 13 illustrating a method for mode selection for a communications session as performed by a second device 12b. The second device 12b is configured to already in its first message transmitted to the first device 12a include information about which mode of operation is selected by the second device 12b. The processing unit 21 of the second device 12b is thus arranged to, in a step S202, receive, from the first device 12a an initial transmit packet of a communications session. This receive step may be performed by executing functionality of the receive unit 21b. The computer program 32a, 32b and/or computer program product 31a, 31b may thus provide means for this receive step. The initial transmit packet indicates at least two modes of operation configurable by the first device 12a during the communications session. The message as transmitted in step S102 is thus received by the second device 12b in step S202.

The second device 12b is then configured to, based on the received initial transmit packet, select one mode of operation to be used. The processing unit 21 of the second device 12b is thus arranged to, in a step S204, select one of the at least two modes of operation configurable by the second device 12b during the communications session. This select step may be performed by executing functionality of the select unit 21c. The computer program 32a, 32b and/or computer program product 31a, 31b may thus provide means for this select step.

Information about the selected mode of operation is then sent to the first device 12a. Particularly, the processing unit 21 of the second device 12b is thus arranged to, in a step S206, transmit, to the first device 12a, an initial receive packet of the communications session. This transmit step may be performed by executing functionality of the transmit unit 21a. The computer program 32a, 32b and/or computer program product 31a, 31b may thus provide means for this transmit step. The initial receive packet indicates one of the at least two modes of operation. The initial receive packet is received by the first device 12a in step S104.

Reference is now made to FIG. 14 illustrating further methods for mode selection for a communications session as performed by a second device 12b.

There may be different ways for the second device 12b to select one of the at least two modes of operation. Different embodiments relating thereto will now be described in turn. For example, the selection may be based on the quality of the initial transmit packet as received in step S202.

The second device 12b may estimate its current channel conditions based for example on the received initial transmit packet and to the first device 12a select its mode of operation based on the current channel conditions. According to an embodiment the processing unit 21 of the second device 12b is arranged to, in an optional step S204a select the one of the at least two modes based on a capability and channel conditions of the second device 12b. This select step may be performed by executing functionality of the select unit 21c. The computer program 32a, 32b and/or computer program product 31a, 31b may thus provide means for this select step, Further, as noted above, each one of the at least two modes of operation may be associated with a unique energy consumption level. According to an embodiment the processing unit 21 of the second device 12b is therefore arranged to, in an optional step S204b, select the one of the at least two modes of operation associated with lowest energy consumption. This select step may be performed by executing functionality of the select unit 21c. The computer program 32a, 32b and/or computer program product 31a, 31b may thus provide means for this select step. The selection may also be based on the received energy level of the received initial transmit packet.

Yet further, as noted above, each one of the at least two modes of operation may be associated with a unique robustness to channel interference level. According to an embodiment the processing unit 21 of the second device 12b is therefore arranged to, in an optional step S204c, select the one of the at least two modes of operation associated with a highest robustness. This select step may be performed by executing functionality of the select unit 21c. The computer program 32a, 32b and/or computer program product 31a, 31b may thus provide means for this select step, According to yet a further embodiment the second device 12b is configured to select the one of the at least two modes of operation based on a combination of the above.

There may be different ways for the second device 12b to indicate the selected one of the at least two modes of operation. Different embodiments relating thereto will now be described in turn. According to an embodiment the processing unit 21 of the second device 12b is arranged to indicate the one of the at least two modes of operation by, in an optional step S206a, transmitting the initial receive packet at a predetermined time instant from receiving the initial transmit packet. This transmit step may be performed by executing functionality of the transmit unit 21a. The computer program 32a, 32b and/or computer program product 31a, 31b may thus provide means for this transmit step. The predetermined time instant may be determined based on the one of the at least two modes. This may allow the first device 12a to detect the selected mode in a series fashion as in step S104d and step S104e above.

Embodiments relating to further details of mode selection for a communications session will now be disclosed.

There may be different ways for the first device 12a to transmit the initial transmit packet and for the second device to transmit the initial receive packet. Different embodiments relating thereto will now be described in turn. According to the sequence diagram of FIG. 6 the initial transmit packet may be a page message and the initial receive packet may be a page response message. According to the sequence diagram of FIG. 7 the initial transmit packet may be a poll message and the initial receive packet may be a data message. Thus, an indicator indicating the ability to support a first mode (such as a 1 Mbps mode) or a second mode (such as a 2 Mbps mode) may be used in the page and poll messages, respectively. If the second device 12b is capable of supporting the 2 Mbps mode, it will indicate this in the page response (as in FIG. 6) or directly use the 2 Mbps mode for the very first data packet (as in FIG. 7). In this respect the terms page message, page response message, poll message, and data message are to be understood in a broad sense as representing messages of a first instant for a potential communication session between devices which potentially have not been in connection before; it is thus not a prerequisite that communications has previously been established between the first device 12a and the second device 12b. Further, as is understood by the person skilled in the art, these are just examples of messages that can be used to signal the at least two modes and the selected one of the at least two modes. For example, the initial transmit message and the initial response message may be based on inquiry and advertising messages.

There may be different ways to indicate the at least two modes of operation in the first transmit packet.

For example, there may be different ways of ordering the at least two modes of operation. According to an embodiment the at least two modes of operation are indicated in an order of preference for use by the first device 12a. Hence the different modes of operations may be provided according to an ordered list such that if the first device 12a indicated a specific mode of operation as optimal, it can be determined what modes of operation the first device 12a supports in addition to the most suitable mode.

For example, the at least two modes of operation may either be explicitly indicated or implicitly indicated. According to an embodiment the at least two modes of operation are explicitly indicated in the initial transmit packet. Further, according to an embodiment the at least two modes of operation are explicitly indicated by in the initial transmit packet specifying at least one mode of operation not being supported by the first device 12a. Hence, in a case there are four modes of operation hereinafter schematically denoted Mode 1, Mode 2, Mode 3, and Mode 4, the first device 12a may explicitly indicate that it does not support Mode 4, thereby also implicitly indicating that it supports Mode 1, Mode 2, and Mode 3.

For example, there may be a specific field in the initial transmit packet for indicating the at least two modes of operation. For example, there may be a specific field in the initial receive packet for indicating the selected mode of operation. According to an embodiment the initial transmit packet comprises a reserve for future use, RFU, field, and the at least two modes of operation are indicated in the RFU field.

For example, the initial transmit packet may be a Bluetooth message. For example, the initial receive packet may be a Bluetooth message. According to an embodiment the at least two modes of operation comprises a Bluetooth low energy legacy mode, and a Bluetooth low energy enhanced mode. Further, according to an embodiment the initial transmit packet is a Bluetooth page message, and the initial receive packet is a Bluetooth page response message.

Figure 9:
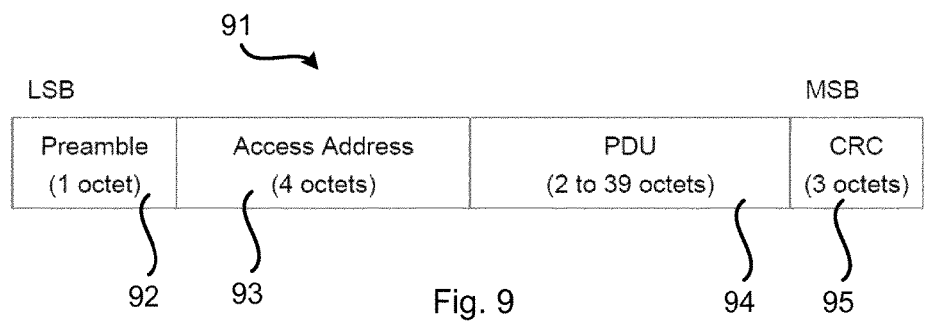
FIG. 9 shows the packet structure of Bluetooth Low Energy.

How the enclosed mechanisms for mode selection may be made backward compatible will now be described. Consider the packet structure of BLE illustrated in FIG. 9. The BLE packet 91 comprises a preamble field 92 intended for initial synchronization, automatic gain control (AGC) adjustment etc., an access address field 93 which is used to identify the packet, a Packet Data Unit (PDU) field 94 which contains the actual user date, and cyclic redundancy check (CRC) field 95 to verify the correctness of the user data.

Figure 10:
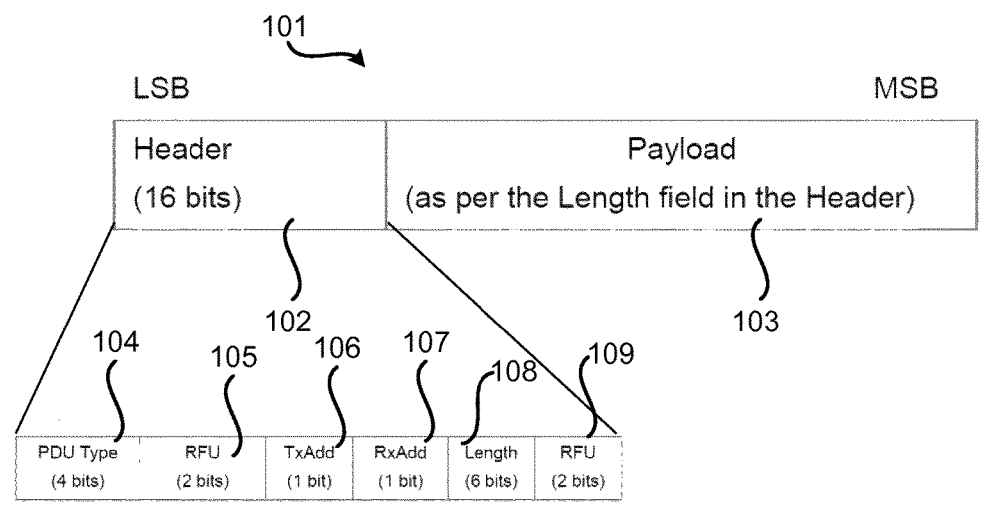
FIG. 10 shows the packet data unit packet structure of Bluetooth Low Energy.

Consider now the structure of the PDU field 94. FIG. 10 schematically illustrates the packet structure of a PDU field 101. The PDU field 101 comprises a header field 102 and a payload field 103. The header field 102 comprises field 104, 106, 107, 108 comprising information about what kind of data is carried in the payload, the length of the payload, etc.

The header field 102 also contains field 105 and 109 with bits which are Reserve for Future Use (RFU). This means that a legacy device will ignore these bits. According to embodiments, one of these RFU fields is used to indicate the mode of operation. Using these fields 105, 109, the second device 12b may indicate the selected mode of operation when transmitting packets as well as checking the corresponding fields 105, 109 when receiving packets.

In general terms, the at least two modes of operation may relate to any type of properties for the communications session between the first device 12a and the second device 12b. For example, the at least two modes of operation may relate to different transmission bit rates, different modulation and coding schemes, different radio access technologies, etc. Thus, according to an embodiment, each one of the at least two modes of operation is associated with at least one of a unique bit rate, and unique physical layer. That is one or more modes of operation may be using one physical layer, say Gaussian Frequency Shift Keying, whereas one or more other modes of operation may be using another physical layer, say orthogonal frequency-division multiplexing (OFDM). If two or more different physical layers are used for the respective modes of operation, the first device 12a needs to be configured to receive the response packet regardless of which mode is selected by the second device 12b.

It may, for various reasons be so that the mode of operation is changed during the communications session. For example, the use of an enhanced mode requires that both devices 12a, 12b are configurable to use this mode of operation, but it may also require that, for instance, the channel conditions are good enough. If the channel conditions during the communications session drop below a predetermined threshold level, the devices 12a, 12b may select to use a legacy mode instead of the enhanced mode (provided that the legacy mode is more robust to channel errors, etc.). Thus, the second device 12b may in step S206 reply with a packet indicating that the enhanced mode is feasible and also use this mode of operation for the initial packet. However, during the communications session, the devices 12a, 12b may have to change to the legacy mode. Thus, as understood by the skilled person the channel conditions may change during the session, causing the selected mode of operation to be changed (e.g., from enhanced mode to legacy mode, or vice versa).

An illustrating example based on the above disclosed embodiments will now be described in more detail. As noted above, according to an embodiment, as illustrate in FIG. 6, the mode selection is performed as part of a paging procedure. Specifically, the initial transmit packet is, according to the present illustrative example, represented by a page message sent by the first device 12a, as in step S102. The page message comprises information about what modes of operation the first device 12a supports. When the second device 12b receives the page message from the first device 12a, as in step S202, the second device 12b knows the capabilities of the first device 12a and depending on the capabilities of the second device 12b a proper mode of operation can be selected by the second device 12b, as in step S204. As noted above, suppose that there are two possible modes of operation; a legacy 1 Mbps mode and an enhanced 2 Mbps mode. If the first device 12a only supports the 1 Mbps mode the second device 12b B will respond using this mode, as in step S206, even if the second device 12b also supports the 2 Mbps mode. If, on the other hand, the first device 12a supports the 2 Mbps mode and the second device 12b also supports the 2 Mbps mode, then the second device 12b can decide to use either the 1 Mbps mode or the 2 Mbps mode already in the page response, as transmitted in step S206. As noted above, which mode of operation would be selected by the second device 12b could, for example, depend on the channel conditions. If the page message, as received in step S202, is received at high power, the second device 12b may determine that the channel conditions are good and therefore select, as in step S204, to use the 2 Mbps mode. On the other hand, if the page message, as received in step S202, is received at low power, the second device 12b may select, as in step S204, to use the 1 Mbps mode even if both devices 12a, 12b support the higher rate mode. Finally, in case the first device 12a supports the 2 Mbps mode whereas the second device 12b does not, the communication during the communications session will be in the 1 Mbps mode. In fact, in this case communications session might be a legacy device and not even be aware of that there is another mode of operation available.

In summary, there have been disclosed mechanisms for mode selection for a communications session. The mechanisms for mode selection follow a communication protocol where the selected mode of operation is determined based on the information sent in the first packet of a communication session from the first device 12a, and where the decision regarding which mode of operation is made by a second device 12b capable of operating in more than one mode of operation.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

Additionally, a method for mode selection for a communications session, the method being performed by a first device 12a may comprise transmitting to a second device 12b, an initial transmit packet of a communications session, the initial transmit packet indicating at least two modes of operation configurable by the first device 12a during the communications session; receiving, from the second device 12b, an initial receive packet of the communications session, the initial receive packet indicating at least two modes of operation configurable by the second device 12b during the communications session; and selecting one of the at least two modes of operation configurable by the first device 12a during the communications session. Likewise, a method for mode selection for a communications session, the method being performed by a second device 12b may comprise receiving, from a first device 12a, an initial transmit packet of a communications session, the initial transmit packet indicating at least two modes of operation configurable by the first device 12a during the communications session; and transmitting, to the first device 12a, an initial receive packet of the communications session, the initial receive packet indicating at least two modes of operation configurable by the second device 12b during the communications session. The selection of which mode of operation to use during the communications session may thus be made by the first device 12a.

Further additionally, a method for mode selection for a communications session, the method being performed by a first device 12a may comprise transmitting, to a second device 12b, an initial response packet of a communications session, the initial response indicating at least two modes of operation configurable by the first device 12a during the communications session; and receiving, from the second device 12b, an acknowledgement packet to the initial response packet, the acknowledgement packet indicating one of the at least two modes of operation configurable by the second device 12b during the communications session. Likewise, a method for mode selection for a communications session, the method being performed by a second device 12b may comprise transmitting, to a first device 12a, an initial transmit packet of a communications session; receiving, from the first device (12a), an initial response packet, the initial response packet indicating at least two modes of operation configurable by the first device 12a during the communications session; selecting one of the at least two modes of operation configurable by the second device 12b during the communications session; and transmitting, to the first device 12b, an acknowledgement packet of the communications session, the acknowledgement packet indicating the one of the at least two modes of operation. The selection of which mode of operation to use during the communications session may thus be preceded by an initial transmit packet transmission from the second device 12b. The initial transmit packet may be empty.

The invention claimed is:

1. A method for mode selection for a communications session, the method being performed by a first device, comprising:
   transmitting, to a second device, an initial transmit packet of the communications session, said initial transmit packet indicating at least two modes of operation configurable by the first device during the communications session, wherein each one of said at least two modes of operation is associated with a particular predetermined time instant;
   receiving, from the second device, an initial receive packet of the communications session, said initial receive packet indicating one of said at least two modes of operation configurable by the second device during the communications session; and
   receiving said initial receive packet at a predetermined time instant from transmitting said initial transmit packet, said predetermined time instant indicating said one of said at least two modes;
   wherein receiving said initial receive packet comprises, sequentially for each one of said at least two modes of operation in turn and until said initial receive packet has been received, scanning for reception of said initial receive packet during said predetermined time instant for one of said at least two modes of operation and evaluating a result of the scanning for detection of said initial receive packet.

2. The method according to claim 1, wherein said at least two modes of operation are based on a capability and channel conditions of the first device.

3. The method according to claim 1, wherein each one of said at least two modes of operation is associated with a unique energy consumption level.

4. The method according to claim 1, wherein each one of said at least two modes of operation is associated with a unique robustness to channel interference level.

5. The method according to claim 1, wherein said at least two modes of operation are indicated in an order of preference for use by the first device.

6. The method according to claim 1, wherein said at least two modes of operation are explicitly indicated in the initial transmit packet.

7. The method according to claim 1, wherein said at least two modes of operation are explicitly indicated by in the initial transmit packet specifying at least one mode of operation not being supported by the first device.

8. The method according to claim 1, wherein said initial receive packet comprises a header, and wherein said one of said at least two modes of operation is indicated in said header.

9. The method according to claim 1, wherein the initial transmit packet comprises a reserve for future use (RFU) field, and wherein said at least two modes of operation are indicated in said RFU field.

10. The method according to claim 1, wherein the initial transmit packet is a Bluetooth low energy advertising message.

11. The method according to claim 1, wherein each one of the at least two modes of operation is associated with at least one of a unique bit rate, and unique physical layer.

12. The method according to claim 1, wherein the at least two modes of operation comprises a Bluetooth low energy legacy mode, and a Bluetooth low energy enhanced mode.

13. The method according to claim 1, wherein one of the first device and the second device is a data collector device and wherein the other of the first device and the second device is a data sensor device.

14. A device for mode selection for a communications session, the device comprising a processing unit arranged to:
   transmit, to a second device, an initial transmit packet of a communications session, said initial transmit packet indicating at least two modes of operation configurable by the device during the communications session, wherein each one of said at least two modes of operation is associated with a particular predetermined time instant; and
   receive, from the second device, an initial receive packet of the communications session, said initial receive packet indicating one of said at least two modes of operation configurable by the second device during the communications session;
   wherein said initial receive packet is received at a predetermined time instant from transmitting said initial transmit packet, said predetermined time instant indicating said one of said at least two modes; and
   wherein said initial receive packet is received by, sequentially for each one of said at least two modes of operation in turn and until said initial receive packet has been received, scanning for reception of said initial receive packet during said predetermined time instant for one of said at least two modes of operation, and evaluating a result of the scanning for detection of said initial receive packet.

15. A nontransitory computer readable storage medium comprising a computer program for mode selection for a communications session, the computer program comprising computer program code which, when run on a device, causes the device to:
   transmit, to a second device, an initial transmit packet of a communications session, said initial transmit packet indicating at least two modes of operation configurable by the device during the communications session, wherein each one of said at least two modes of operation is associated with a particular predetermined time instant;
   receive, from the second device, an initial receive packet of the communications session, said initial receive packet indicating one of said at least two modes of operation configurable by the second device during the communications session; and receive said initial receive packet at a predetermined time instant from transmitting said initial transmit packet, said predetermined time instant indicating said one of said at least two modes;

wherein said initial receive packet is received by, sequentially for each one of said at least two modes of operation in turn and until said initial receive packet has been received, scanning for reception of said initial receive packet during said predetermined time instant for one of said at least two modes of operation, and evaluating a result of the scanning for detection of said initial receive packet.

\* \* \* \* \*